May 20, 1958  J. W. MELLINGER  2,835,233
WATER INJECTION SYSTEMS FOR INTERNAL COMBUSTION ENGINES
Filed Jan. 6, 1956  2 Sheets-Sheet 1
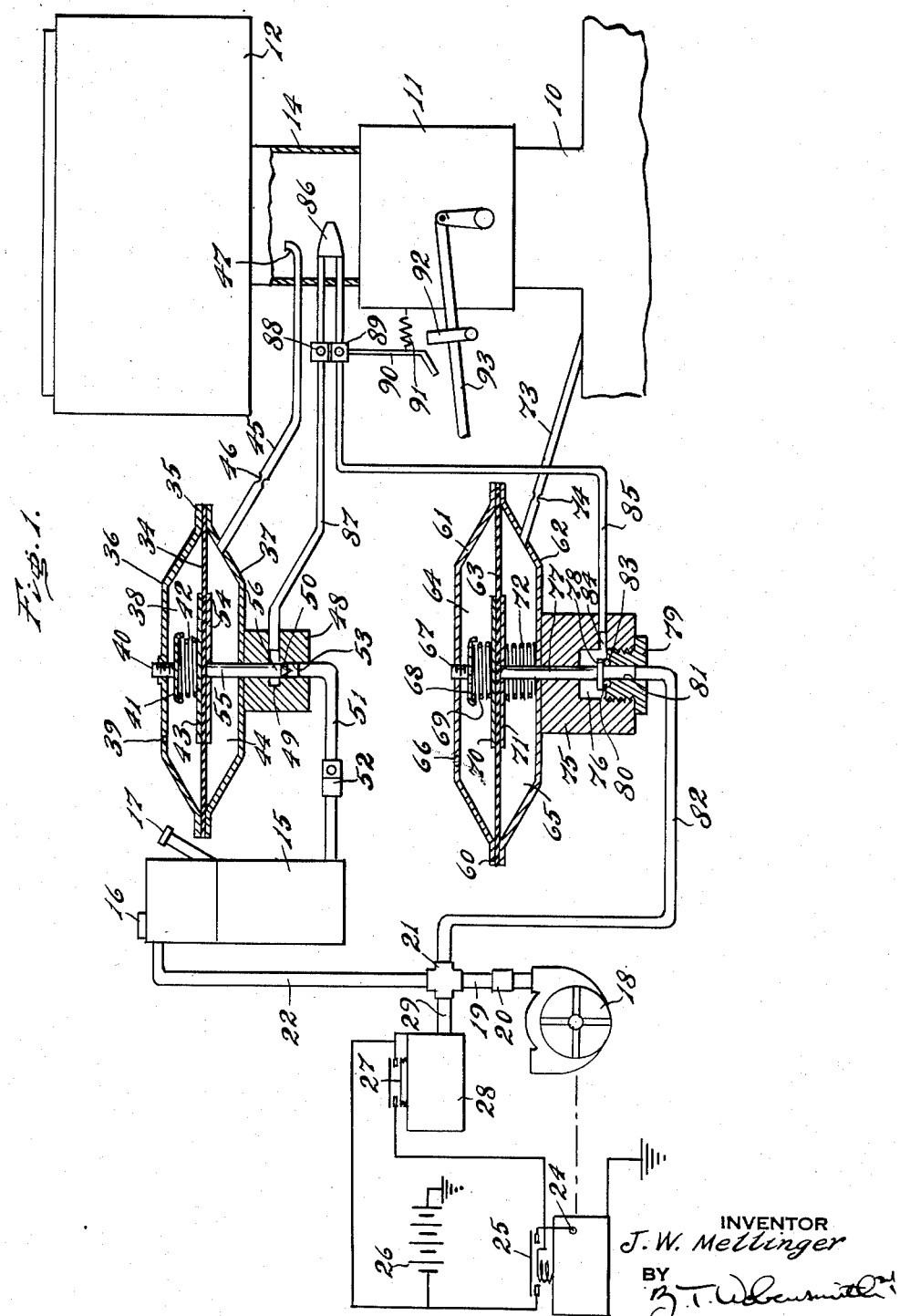
INVENTOR
J. W. Mellinger
BY
ATTORNEY

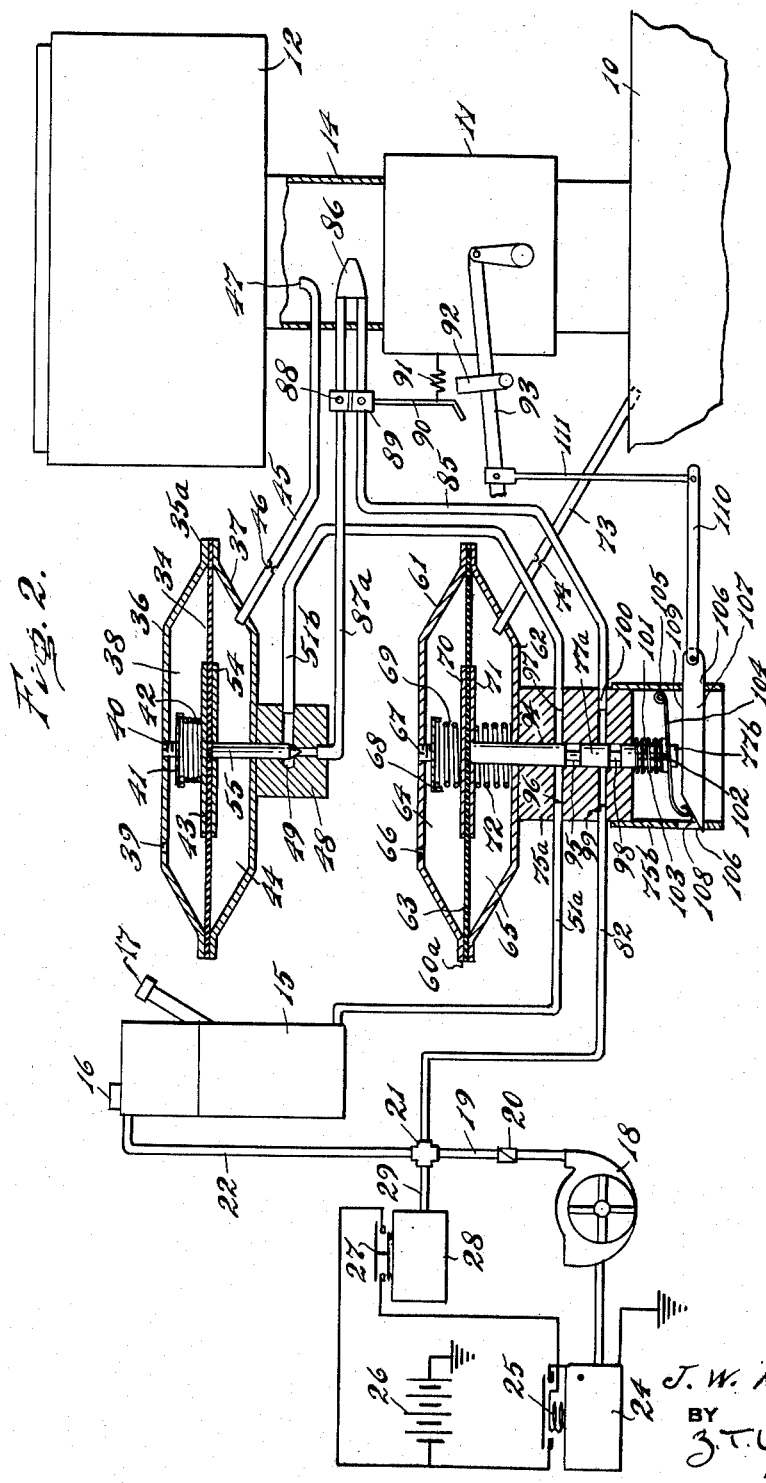

Patented May 20, 1958

2,835,233

WATER INJECTION SYSTEMS FOR INTERNAL COMBUSTION ENGINES

Jacob William Mellinger, New Holland, Pa.

Application January 6, 1956, Serial No. 557,710

16 Claims. (Cl. 123—25)

This invention relates to water injection systems for internal combustion engines.

It has heretofore been proposed to introduce into the cylinders of an internal combustion engine, and with the fuel mixture, water vapor for the purpose of improving the operation of the engine. Various systems have heretofore been proposed to control the delivery of the water but none of these has proved entirely satisfactory. It is actually disadvantageous to use water in vapor form as has heretofore been proposed because the vapor takes up space needed by the fuel mixture so that the maximum volumetric efficiency of the engine is reduced.

It has also heretofore been proposed to utilize the vacuum in the intake manifold of an internal combustion engine for drawing water in. Such arrangements require a very efficient atomizing structure as well as expensive control structure.

It is the principal object of the present invention to provide an improved water injection system for internal combustion engines for the primary purpose of suppressing detonation.

It is a further object of the present invention to provide a water injection system for internal combustion engines in which the liquid is maintained at the desired pressure for delivery so that the same is not dependent upon the vacuum in the engine manifold.

It is a further object of the present invention to provide a water injection system for internal combustion engines having provisions for accurately controlling the delivery of the water.

It is a further object of the present invention to provide a water injection system for internal combustion engines which operates only when water delivery is desired.

It is a further object of the present invention to provide a water injection system for internal combustion engines in which the liquid is delivered in finely divided liquid form and intimately mixed with the air passing through the intake manifold.

It is a further object of the present invention to provide a water injection system for internal combustion engines which can be readily adjusted for different applications and different operating conditions.

It is a further object of the present invention to provide a water injection system for internal combustion engines in which the component parts can be easily made, readily installed, and quickly adjusted.

Other objects and advantageous features of the invention will be apparent from the specification and claims.

The nature and characteristic features of the invention will be more readily understood from the following description, taken in connection with the accompanying drawings forming part thereof, in which:

Figure 1 is a view partly diagrammatic and partly in vertical section, illustrating the invention; and Fig. 2 is a view similar to Fig. 1, illustrating an alternative form of the invention.

It should, of course, be understood that the description and drawings herein are illustrative merely, and that various modifications and changes can be made in the structure dsclosed without departing from the spirit of the invention.

Like numerals refer to like parts throughout the several views.

Referring now more particularly to Fig. 1 of the drawings, the intake manifold of an internal combustion engine to which the water is to be supplied is shown at 10, having a carburetor 11 of any desired type mounted thereabove and provided with an air filter 12. Interposed between the air filter 12 and the carburetor 11, a collar 14 is provided and held in any desired manner, for the connection of the water injection system to be described.

A water supply tank or reservoir 15 is provided, from which the water for injection is delivered, under pressure. The tank 15 which may have an air cushion at the upper part thereof so as to function as a pressure equalizing tank, is provided with a filler cap 16. The cap 16 can be used when the tank is employed only as a water reservoir with the pressure head relied upon, and a filler cap 17 can be provided which is used when the top portion of the tank 15 is employed as a pressure equalizing tank or surge chamber.

While the desired pressure of the water from the tank 15 can be achieved in different ways, in a preferred embodiment of the invention an air compressor 18 is provided, driven in any desired manner and connected by an air delivery pipe 19, past a non-return or check valve 20, and through a connecting fitting 21 and pipe 22 to the tank 15.

One suitable driving and air pressure control system is shown which includes an electric motor 24 connected to ground and with a relay 25 for controlling the energization thereof from a battery 26, or other suitable source of electric energy, in accordance with the positioning of an air pressure actuated switch 27. The switch 27 can be mounted on an air surge chamber 28 which is connected by a pipe 29 to the connecting fitting 21. The switch 27 moves at a predetermined low air pressure level to complete a circuit for energizing the motor 24.

The motor 24 is connected by any suitable mechanical connection to the compressor 18.

A pressure responsive control or metering valve 35 is provided, which includes a housing having an upper housing section 36 and a lower housing section 37 with a flexible diaphragm 34 interposed therebetween. The upper housing section 36 provides with the diaphragm 34 a chamber 38 which is in communication with the atmosphere through a restricted port or vent 39 for retarding the movement of the diaphragm 34 in either direction. The upper housing section 36 has mounted therein an adjusting screw 40 which is in engagement with a spring abutment 41. A spring 42 is interposed between the abutment 41 and a diaphragm plate 43 which is connected to the diaphragm 34 and the spring force of the spring 42 is adjustable by the adjusting screw 40.

The lower housing section 37 provides, with the diaphragm 34, a chamber 44.

The chamber 44, below the diaphragm 34 is in communication through a passageway 45, having a restriction 46 therein for reducing the effect of a rapid or minor fluctuation, with an impact or pitot tube 47 disposed within the collar 14 and facing towards the upper or inlet end of the collar 14.

Extending downwardly from the lower housing section 37, a valve housing section 48 is provided, having a valve chamber 49 therein with a valve seat 50.

A pipe 51, with a check valve 52 therein, connects the tank 15 with a passageway 53, in the valve housing section 48, the passageway 53 being in communication with the valve chamber 49 at the seat 50.

The diaphragm 34 has secured thereto a diaphragm plate 54 to which is secured a valve stem 55 having a conical end portion 56 for seating on the valve seat 50.

An additional pressure responsive control unit 60 is provided, which includes an upper housing section 61 and a lower housing section 62 with a flexible diaphragm 63 interposed therebetween and separating an upper fluid pressure chamber 64 from a lower fluid pressure chamber 65. The upper fluid pressure chamber 64 is in communication with the atmosphere through a restricted port or vent 66 for retarding the movement of the diaphragm 63 in either direction.

The upper housing section 61 has mounted in engagement therewith an adjusting screw 67 which is in engagement with a spring abutment 68. A helical spring 69 is interposed between the spring abutment 68 and a diaphragm plate 70 which is connected to the diaphragm 63. The diaphragm 63, on the underside thereof, has a diaphragm plate 71 with a helical spring 72 in engagement therewith, the spring 72 also being in engagement with the lower housing section 62.

The chamber 65 is connected by a fluid connection 73, having a restriction 74 therein, to the intake manifold 10 of the engine, so that the same pressure will prevail in the chamber 65 as in the intake manifold 10, but free from rapid or minor fluctuations.

The lower housing section 62 has also extending downwardly therefrom a valve body portion 75 having a valve chamber 76 therein. A valve stem 77 connected to the diaphragm 63 is provided, and the valve stem 77 has an enlarged head 78 disposed within the valve chamber 76.

The valve chamber 76 is closed by a closure plug 79 having a valve seat 80 on the upper face thereof, and has a fluid connection 81 in communication with a pipe 82 leading to the fitting 21.

If desired, the valve seat 80 may have a resilient rubber seating ring 83 thereon for engagement by the valve head 78. The valve chamber 76 is connected by a passageway 84, with which a pipe 85 is in communication, to a spray head 86 disposed within the collar 14.

A water supply pipe 87 extending from the valve chamber 49 to the spray head 86 for supplying water for spraying.

Valves 88 and 89 are provided in the pipes 85 and 87 to which a valve actuator lever 90 is connected. The valve actuator lever 90 is normally urged to a valve closing position by a spring 91 and can be moved to a valve opening position by movement of an adjustable arm 92 mounted on the throttle control linkage 93 of the carburetor 11.

Referring now more particularly to Fig. 2 of the drawings, a motor 24, compressor 18, air tank 28 and water supply tank 15, are provided, as before.

A pressure responsive control or metering valve 35a is provided similar to the control valve 35, previously described, but with a fluid inlet pipe 51b connected thereto as hereafter explained, and a fluid delivery pipe 87a connected to the spray nozzle 86 through the shutoff valve 88.

An additional pressure responsive control unit 60a is provided, which includes an upper housing section 61 and a lower housing section 62, with a flexible diaphragm 63 interposed therebetween, and separating an upper fluid pressure chamber 64 from a lower fluid pressure chamber 65. The upper fluid pressure chamber 64 is in communication, as before, with the atmosphere through a restricted port or vent opening 66.

The upper housing section 61 has mounted therein the adjusting screw 67 in engagement with the spring abutment 68 and with the helical spring 69 disposed in the chamber 64 in engagement with the spring abutment 68 and the diaphragm plate 70 carried by the diaphragm 63. The spring force of the spring 69 can be varied by adjustment of the screw 67. The diaphragm 63 also has the helical spring 72 effective in the chamber 65 on the lower face of the diaphragm 63, and the chamber 65 is in communication, as before, with the intake manifold 10 of the engine.

The lower housing section 62 has a valve body portion 75a extending downwardly therefrom, with a bore 94. The bore 94 has a valve stem 77a therein which is provided with a groove 95 therearound for establishing and cutting off communication between opposed passageways 96 and 97. The passageway 96 is connected by the fluid connection 51a to the tank 15, and the passageway 97 is connected by a fluid connection 51b to the valve chamber 49. The valve stem 77a also has a groove 98 therearound in spaced relation to the groove 95 for establishing and cutting off communication between passageways 99 and 100 and is preferably located so that the groove 95 establishes communication just before the groove 98 is effective to establish communication. The passageway 99 is connected by the pipe 82 to the fitting 21 and the passageway 100 is connected by the pipe 85 to the nozzle 86, with the valve 88 interposed therein, as before.

The body portion 75a has extending downwardly therefrom a hollow housing portion 75b and an extension 77b of the stem 77a extends downwardly therein. The stem extension 77b is provided with a slot 101 within which a transversely disposed pin 102 is slidably movable to provide a lost motion connection. A helical spring 103 is provided, interposed between the pin 102 and the lower face of the body portion 75a for normally urging the pin 102 and the valve stem 77a downwardly.

A bifurcated actuating arm 104 is provided, pivotally mounted on the housing portion 75b by a pivot pin 105 and is adapted for engagement with the pin 102 for urging the pin 102 and the spring 103 upwardly, as hereinafter explained. The body portion 75b is provided with aligned diametrically disposed slots 106 for the reception of a slidable cam 107 having an inclined face 108 and a flat upper face 109 for engagement, in accordance with the position of the cam 107, with the end of the actuating arm 104. The cam 107 has a link 110 connected thereto which is pivotally connected to an arm 111 carried by the throttle control linkage 93 at the desired position of adjustment therealong.

The mode of operation will now be explained:

The detonation in an automotive engine appears to occur at a given load, without regard to the speed of rotation, and at such load the same value of the vacuum prevails at the intake manifold. For example, if at the cruising speed of the vehicle a particular vacuum, such as 17 inches of mercury, prevails in the intake manifold, and the knock occurs at a different predetermined value, such as 14 inches of mercury, for that engine the knock will always commence at the latter vacuum level without regard to the speed.

At wide open throttle, there is substantially no vacuum in the intake manifold. The variation between the value of the vacuum at wide open throttle and at no load conditions indicates that if the vacuum were relied upon to supply the water, at the load conditions where more water is desired, less water would be drawn in because of the reduced vacuum.

If water in vaporized form were used, the maximum volumetric efficiency of the engine would be reduced as the vapor takes up space required by the fuel mixture. A spray or mist of liquid particles will not take up this space and at the same time will have a higher heat absorbing action because of the latent heat of vaporization of the liquid.

The water introduced as herein described has the effect of reducing the temperature of the combustion and slowing down the rate of burning so that detonation is prevented. Many of the fuels now available use an additive to slow down the rate of burning. The water introduction, in accordance with the present invention, will avoid the necessity for use of such additives.

With the engine stopped, or idling, the spring 91 maintains the valves 88 and 89 in closed position, to cut off both air and water to the spray head 86.

With the engine operating at normal load or cruising, vacuum from the intake manifold 10 is effective, through the fluid connection 73 and on the diaphragm 63, to overcome the force of the spring 72 to maintain the valve head 78 in closed position with respect to the valve seat 80. The valve portion 56 may be seated or may be at some position other than seated, depending on the setting of the spring 42, and the impact pressure transmitted through the impact tube 47 and effective through the pipe 45 in the chamber 44 on the diaphragm 34. The valves 88 and 89 will have been opened by movement of the throttle control linkage 93. No liquid will, however, flow so long as the closed condition prevails, obtained by the seating of the valve portion 56 on the valve seat 50.

Referring now to Fig. 1, if the vacuum in the manifold 10 should decrease, as occurs when the engine is under load, the decrease is effective in the chamber 65, so that the force of the spring 72 is sufficient to overcome the force of the spring 69. With the valve head 78 away from its seat, air under pressure from the pipe 82 will flow through the valve chamber 76 and through the pipe 88 to the spray head 86. As the escaping air expands at the spray head 86 it will draw water from the tank 15, aided by the pressure effective in the tank 15. Water in finely divided form will thus be delivered at the spray head 86 within the collar 14 and thoroughly mixed with the air passing through the collar 14 to the carburetor 11 and through the intake manifold 10 to the engine. The quantity of liquid delivered will be dependent in part on the seating of the metering valve 35, which is in turn controlled by the impact pressure effective through the pipe 47 and in the chamber 44.

Referring now to Fig. 2, if the pressure in the manifold 10 should drop, as occurs when the engine is under load, the drop is effective in the chamber 65 so that the force of the spring 72 is sufficient to overcome the force of the spring 69.

The valve stem 77a is moved upwardly and the groove 95 is moved to a position to establish communication between the passageways 96 and 97 and between the passageways 95 and 100. This is ordinarily not effected, however, unless the cam 107 is moved to a position to overcome the force of the spring 103 with its lost motion connection to the valve stem 77b. With the air and water supply permitted by the valve 60a and further as determined by the metering valve 35a, air and water are delivered through the pipes 85 and 87 to the spray head 86 for delivery in finely divided form at the spray head 86. The valves 88 and 89 will, of course, be opened by the same movement of the throttle control linkage 93 which actuates the cam 107.

It will thus be seen that water, in finely divided form, is supplied for admixture with the air delivered to the carburetor, as controlled by the positioning of the throttle control linkage 93, the pressure conditions in the intake manifold of the engine, and the pressure conditions at the inlet of the carburetor. By suitable adjustment of the adjusting screws 40 and 67, and positioning of the arm 92, and additionally in the form of the invention illustrated in Fig. 2 by adjustment of the arm 111, water in finely divided form can be supplied and limited to the particular operating conditions, that is, under load, where such water spray is desired to suppress detonation.

I claim:

1. Apparatus for injecting fluent anti-detonant material in finely divided form into the fuel system of an internal combustion engine having a carburetor with a throttle control linkage and connected to the intake manifold of the engine, comprising a source of fluent anti-detonant material under pressure, a fluent material supply connection in communciation with said source of material, an attaching member at the inlet of said carburetor, a source of air under constant pressure, an air supply connection in communication with said source, a device in said attaching member and in communication with said fluent material supply connection and said air supply connection for discharging said material under pressure in finely divided form, a first pressure responsive member for controlling the delivery of said material through said supply connection, and an impact pressure responsive detecting member in said attaching member and connected to said pressure responsive member for positioning the same in accordance with flow conditions at said detecting member.

2. Apparatus for injecting water in finely divided form into the fuel system of an internal combustion engine having a carburetor with a throttle control linkage and connected to the intake manifold of the engine, comprising a source of water under pressure, a water supply connection in communication with said source of water, a source of air under pressure, an air supply connection in communication with said source of air, an attaching member at the inlet of said carburetor, a spray nozzle in said attaching member and with which said water supply connection and said air supply connection are in communication, a first pressure responsive member for controlling the delivery of water through said water supply connection to said spray nozzle, a pressure responsive detecting member in said attaching member and connected to said first pressure responsive member for positioning the same, a second pressure responsive member for controlling the delivery of air under pressure from said source of air, a fluid connection from said intake manifold to said second responsive member for controlling the positioning thereof and thereby controlling the delivery of air from said source.

3. Apparatus as defined in claim 2 in which said first pressure responsive member has a resilient member with its force opposed to the force applied thereon from said attaching member.

4. Apparatus as defined in claim 2 in which said second pressure responsive member has a resilient member acting in the same direction as the force exerted by the vacuum in the intake manifold.

5. Apparatus as defined in claim 2 in which said second pressure responsive member has a resilient member acting in the same direction as the force exerted by the vacuum in the intake manifold, and means is provided for adjusting the force of said last member.

6. Apparatus as defined in claim 2 in which members are provided controlled by the positioning of the throttle control linkage for controlling the supplying of water and air to said spray nozzle.

7. Apparatus as defined in claim 2 in which said second pressure responsive member has a valve portion for controlling the flow of the water from said source of water to said spray nozzle.

8. Apparatus as defined in claim 2 in which loading means is provided for said second pressure responsive member connected thereto by a lost motion connection, and said throttle control linkage has a cam connected thereto for reducing the effect of said loading means.

9. Apparatus as defined in claim 2 in which said first pressure responsive member has a retarding member thereon.

10. Apparatus as defined in claim 2 in which said second pressure responsive member has a retarding member thereon.

11. Apparatus as defined in claim 2 in which the connection between the pressure responsive detecting member and the pressure responsive member is provided with a restriction.

12. Apparatus as defined in claim 2 in which the connection between the intake manifold and the second responsive member is provided with a restriction.

13. Apparatus for injecting water in finely divided form into the fuel system of an internal combustion engine having a carburetor with a throttle control linkage and connected to the intake manifold of the engine, comprising a source of water under pressure, a water supply connection in communication with said source of water, a source of air under pressure, an air supply connection in communication with said source of air, an attaching member at the inlet of said carburetor, a spray nozzle in said attaching member and with which said water supply connection and said air supply connection are in communication, a first pressure responsive member for controlling the delivery of water through said water supply connection, a pressure responsive detecting member in said attaching member and connected to said first pressure responsive member for applying a force thereon determined by the pressure prevailing in said attaching member, a second pressure responsive member for controlling the delivery of air under pressure from said source of air, a fluid connection from said intake manifold to said second responsive member for applying a force thereon determined by the pressure in the intake manifold and thereby controlling the delivery of air from said source of air.

14. Apparatus as defined in claim 13 in which said first pressure responsive member has a resilient member for applying a force opposed to the force applied thereon from said attaching member.

15. Apparatus as defined in claim 13 in which said second pressure responsive member has a resilient member acting in the same direction as the force exerted by the vacuum in the intake manifold, and means is provided for adjusting the force of said last member.

16. Apparatus as defined in claim 13 in which said second pressure responsive member has a valve portion for controlling the flow of the water from said source of water to said spray nozzle.

References Cited in the file of this patent

UNITED STATES PATENTS

| | | |
|---|---|---|
| 2,431,679 | Adair | Dec. 2, 1947 |
| 2,664,871 | Anderson | Jan. 5, 1954 |
| 2,676,577 | Vanderpoel | Apr. 27, 1954 |